(12) United States Patent
Henry et al.

(10) Patent No.: US 9,949,129 B1
(45) Date of Patent: Apr. 17, 2018

(54) LOCATION-SPECIFIC DATA SHARING

(71) Applicant: Cisco Technology, Inc., San Jose, CA (US)

(72) Inventors: Jerome Henry, Pittsboro, NC (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/295,098

(22) Filed: Oct. 17, 2016

(51) Int. Cl.
| | |
|---|---|
| *H04W 12/02* | (2009.01) |
| *H04W 12/08* | (2009.01) |
| *H04W 64/00* | (2009.01) |
| *H04W 48/02* | (2009.01) |
| *H04W 4/02* | (2018.01) |
| *H04W 84/18* | (2009.01) |

(52) U.S. Cl.
CPC ............ *H04W 12/08* (2013.01); *H04W 4/021* (2013.01); *H04W 48/02* (2013.01); *H04W 64/003* (2013.01); *H04W 84/18* (2013.01)

(58) Field of Classification Search
CPC .......... G06Q 10/06; H04W 4/00; H04W 4/20; H04W 84/18
See application file for complete search history.

(56) References Cited

U.S. PATENT DOCUMENTS

| | | | |
|---|---|---|---|
| 2010/0144383 A1* | 6/2010 | Berger | G06Q 10/06 455/521 |
| 2015/0348214 A1 | 12/2015 | Jain | |
| 2015/0350866 A1 | 12/2015 | Patil et al. | |

OTHER PUBLICATIONS

Qiu et al. "Geoencryption System Security: Loran as a Case Study" SCPNT; http://waas.stanford.edu/; p. 1.
Myungcheol Doo "Spatial and Social Diffusion of Information and Influence: Models and Algorithms" Georgia Institute of Technology; Aug. 2012; pp. 1-171.
Lynch et al. "Motion Coordination using Virtual Nodes" CSAIL, MIT; pp. 1-12.

* cited by examiner

*Primary Examiner* — Diane Mizrahi
(74) *Attorney, Agent, or Firm* — Parker Ibrahim & Berg LLP; James M. Behmke; Stephen D. LeBarron (57) ABSTRACT

In one embodiment, a device in a network receives data associated with a particular location. The device determines when the device is at the particular location by monitoring a local position of the device relative to the particular location. The device identifies a node in the network as being co-located with the device at the particular location. The device shares the data with the identified node based on the device and the node being co-located at the particular location.

14 Claims, 11 Drawing Sheets

LOCATION-SPECIFIC DATA SHARING

TECHNICAL FIELD

The present disclosure relates generally to computer networks, and, more particularly, to the sharing of location-specific data in a network.

BACKGROUND

Mesh networks have become increasingly popular and practical in recent years. In particular, shared-media mesh networks, such as wireless or Powerline Communication (PLC) networks, etc., are often on what is referred to as Low-Power and Lossy Networks (LLNs), which are a class of network in which both the routers and their interconnect are constrained. Notably, LLN routers typically operate with highly constrained resources (e.g., processing power, memory, power source, etc.), and communicate via links that are characterized by high loss rates, low data rates, and/or instability.

An example implementation of LLNs is an "Internet of Things" network. Loosely, the term "Internet of Things" or "IoT" may be used to refer to uniquely identifiable objects (things) and their virtual representations in a network-based architecture. In particular, the next frontier in the evolution of the Internet is the ability to connect more than just computers and communication devices, but rather the ability to connect "objects" in general, such as lights, appliances, vehicles, heating, ventilating, and air-conditioning (HVAC) devices, windows and window shades and blinds, doors, locks, etc.

In many instances, network communications occur as an intentional exchange between two or more devices over a defined link and an identifiable period of time. However, with the dynamic nature of mesh networks, the device storing a certain piece of information may not know which node needs the information and, conversely, the node that needs the information may not know which device has the information.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives data associated with a particular location. The device determines when the device is at the particular location by monitoring a local position of the device relative to the particular location. The device identifies a node in the network as being co-located with the device at the particular location. The device shares the data with the identified node based on the device and the node being co-located at the particular location.

Description

A computer network is a geographically distributed collection of nodes interconnected by communication links and segments for transporting data between end nodes, such as personal computers and workstations, or other devices, such as sensors, etc. Many types of networks are available, ranging from near-me area networks (NANs), to local area networks (LANs), to wide area networks (WANs). Typically, NANs connect nodes that are in very close proximity, such as nearby mobile devices. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
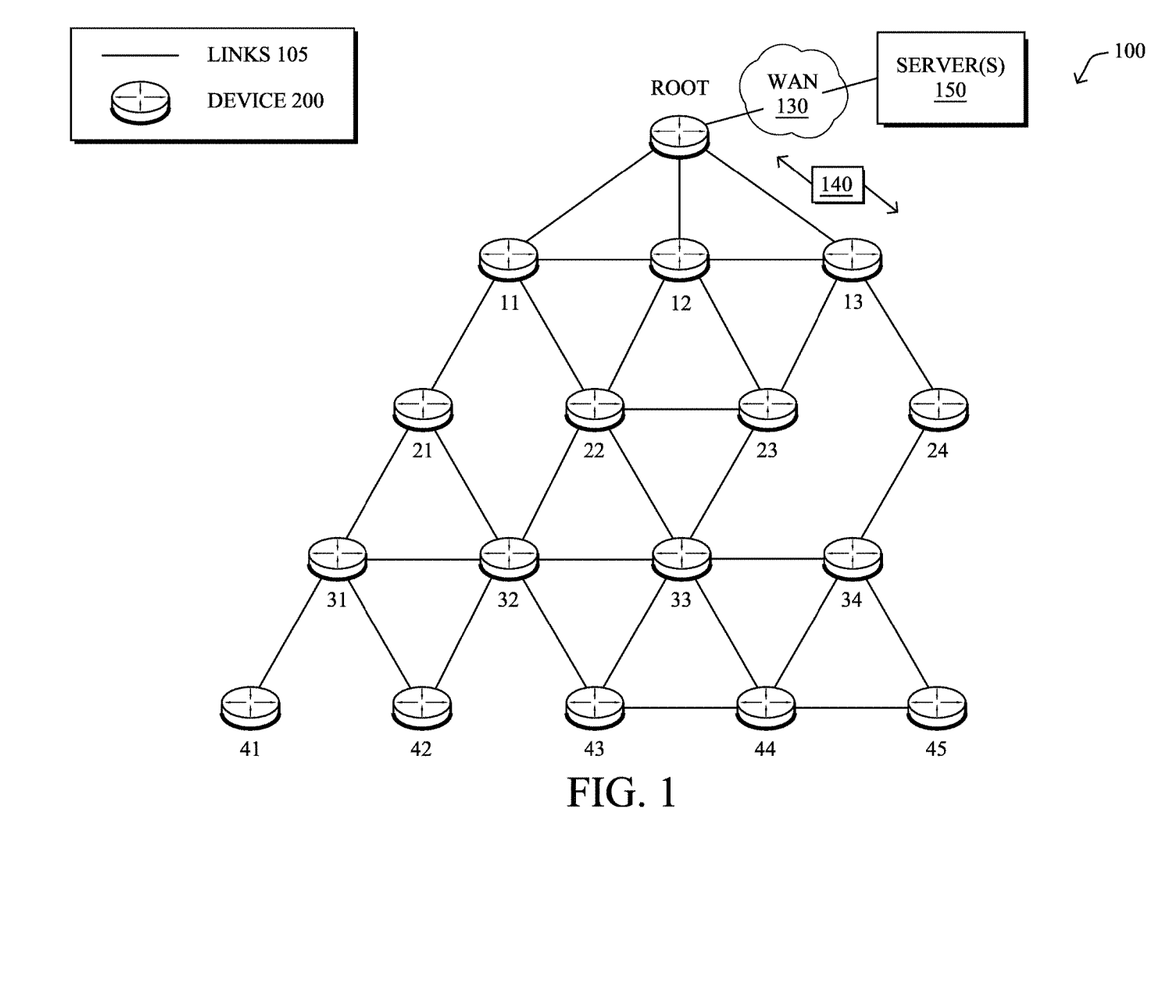
FIG. 1 illustrates an example communication network.

FIG. 1 is a schematic block diagram of an example communication network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) or other access point, may interconnect the local network with a WAN 130, which may house one or more other relevant devices such as management devices or servers 150, e.g., a network management server (NMS), a dynamic host configuration protocol (DHCP) server, a constrained application protocol (CoAP) server, web servers, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the communication network 100 using predefined network communication protocols such as certain known wired protocols, wireless protocols (e.g., IEEE Std. 802.15.4, WiFi, Bluetooth®, etc.), or other shared-media protocols where appropriate. In this context, a protocol consists of a set of rules defining how the nodes interact with each other.

Figure 2:
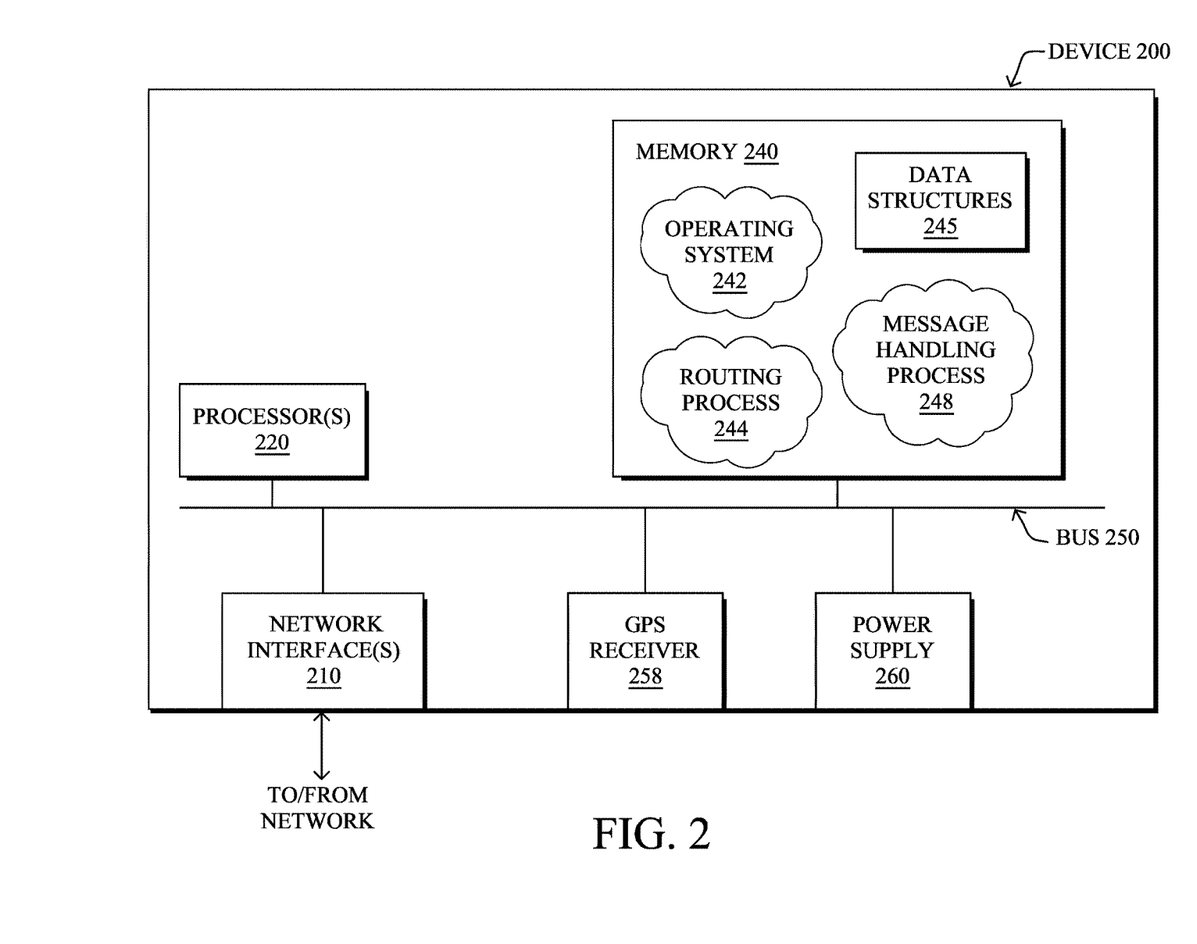
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, a Global Positioning System (GPS) receiver, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative message handling process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs) represent a growing class of networks that, in contrast to traditional networks, exhibit various challenges such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways.

As noted above, communications in many traditional networks occur between a querying node and a data source that is known to the querying node. For example, assume that the querying node needs a temperature reading that is stored in a centralized server. To obtain the reading, the querying node only needs to send a query to the server, since the location of the reading is already known.

In many mesh networks, such as LLNs and IoT networks, however, certain data may not be stored in a known and centralized location, presenting various challenges to the querying node. Notably, not only does the node not know whether the data even exists in the network, in many cases, it may not know the identity of the device(s) in the network that are storing the data. The dynamic nature of mesh networks further complicates the task of retrieving the desired data, as many or all of the devices in the network may be in a constant state of movement.

Location-Specific Data Sharing

The techniques herein allow for devices in a network to store and provide location and time specific data. In some aspects, such data may only be retrievable based on a given location and one or more keywords or other identifying information, such as image recognition. This allows the various devices in the network to make the data available without knowing which other node/device desires this data or when a query for the data will occur. Conversely, this also allows a querying node/device to retrieve location-relevant information without having to know the storage device beforehand.

Specifically, according to one or more embodiments of the disclosure as described in detail below, a device in a network receives data associated with a particular location. The device determines when the device is at the particular location by monitoring a local position of the device relative to the particular location. The device identifies a node in the network as being co-located with the device at the particular location. The device shares the data with the identified node based on the device and the node being co-located at the particular location.

Illustratively, the techniques described herein may be performed by hardware, software, and/or firmware, such as in accordance with the message handling process 248, which may include computer executable instructions executed by the processor 220 (or independent processor of interfaces 210) to perform functions relating to the techniques described herein, e.g., in conjunction with routing process 244.

Operationally, FIGS. 3A-3D illustrate the spread of data at a particular location, according to various embodiments. According to various embodiments, the techniques herein effectively create a virtual information repository at a particular location, as well as provide information processing of the stored data. In other words, the data stored in the virtual repository may be updated over time, as additional or contextual information is garnered. Such information can be used to perform a query for the data using keywords or other characteristics, to unlock access to the information-relevant data.

Figure 3A:
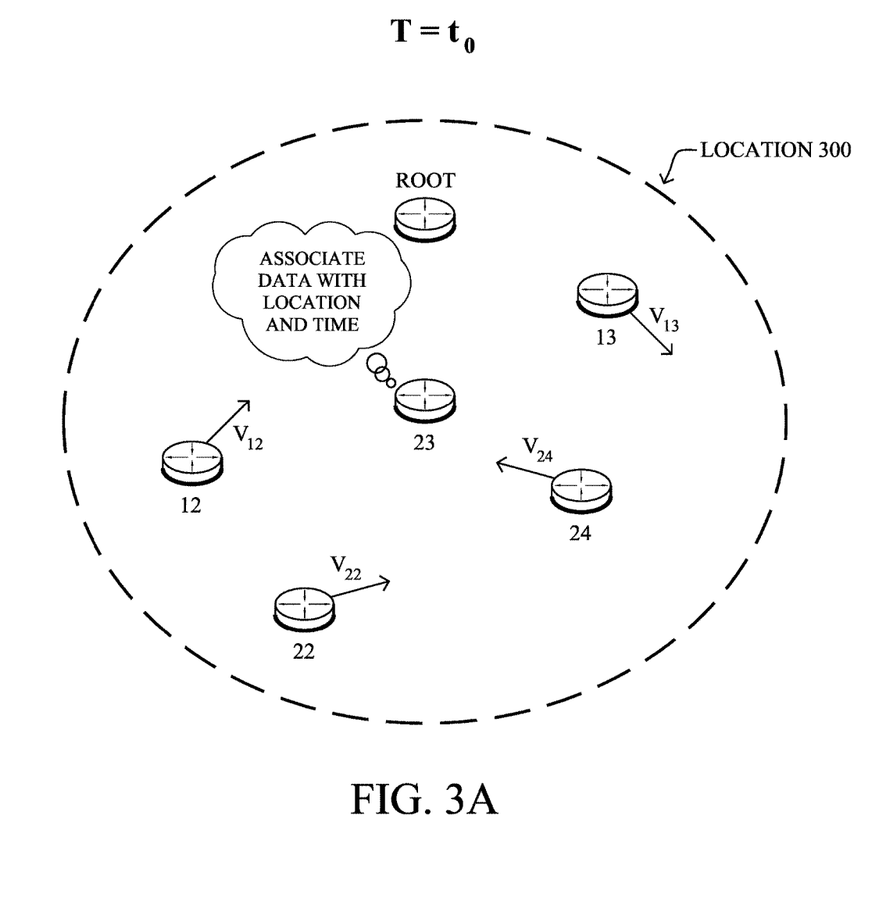
FIGS. 3A-3D illustrate the spread of data at a particular location.

According to various embodiments, the device that first generates data to be stored in the virtual repository may associate the data with the location at which the data was generated and/or a time at which the data was generated. For example, as shown in FIG. 3A, assume that node/device 23 generates a set of data at time $T=t_0$ while located at location 300. In various embodiments, location 300 may correspond to a GPS coordinate at which node/device 23 is located, an area within a threshold distance of the GPS coordinate (e.g., a threshold radius, etc.), a location based on wireless triangulation or other proximity sensing mechanism (e.g., cellular, WiFi, etc.), a street address, building, floor, room, landmark, or the like.

Also shown are illustrative nodes/devices 12, 13, 22, 24, which may be mobile nodes/devices that are traveling in the indicated directions at velocities $v_{12}$, $v_{13}$, $v_{22}$, $v_{24}$, respectively, within location 300. Further, as shown, location 300 may also include any number of stationary nodes/devices, such as the Root node shown (e.g., a wireless router, access point, etc.), security camera, etc.

After the originating device generates the data to be shared and associates the data with the location and/or time, the device may share the data with any nearby nodes/devices in the location. In particular, in various embodiments, passing nodes/devices at the associated location can share the data with one another. For example, an information source (e.g., a smartphone or other mobile device) may make the generated data available to other nearby nodes/devices at the location using NAN or other transmission mechanisms. This allows the data to be passed to any nearby access points, as well as other neighboring nodes/devices (e.g., other smartphones or other mobile devices, etc.). As device owners move, the data then hops across devices. However, in some embodiments, the data may only hop between devices that are within the originating location (e.g., a configurable range of the original coordinates, etc.), thus making the data actively available at the location of its initial emission, even if the emitting device departs the location.

Figure 3B:
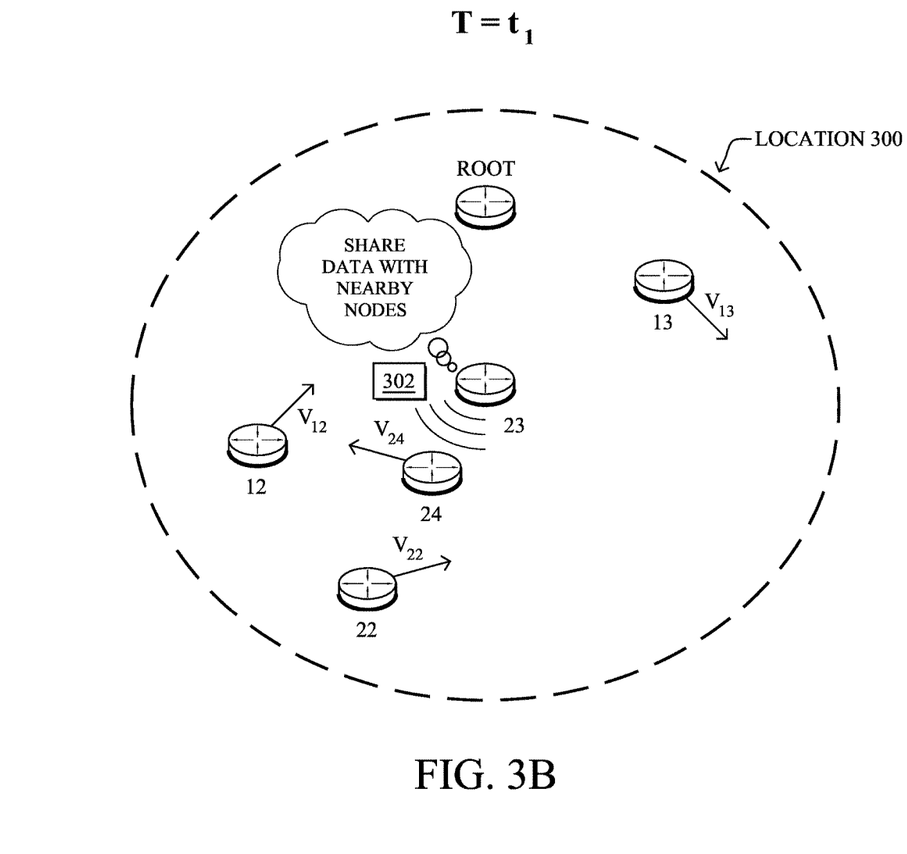

For example, as shown in FIG. 3B, assume that time $T=t_1$, originating node 23 is within proximity of node/device 24 and both are co-located at location 300. Originating node 23 may then share the generated data, its associated location (e.g., an identifier for location 300), and/or its timestamp with nearby node/device 24 via a message 302.

Figure 3C:
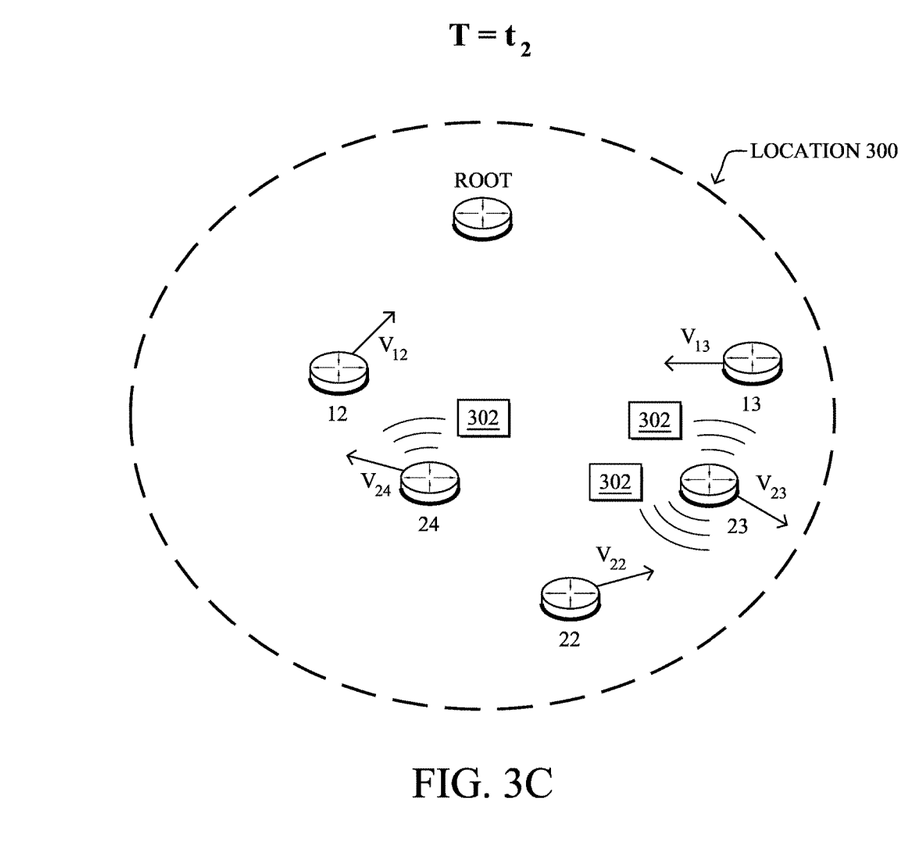

In FIG. 3C, at time $T=t_2$, node 23 may subsequently encounter mobile nodes/devices 13 and 23, all of which are still co-located at location 300. In turn, node 23 may share the location-specific data with nodes 13 and 23 by transmitting messages 302 to nodes 13 and 23. Also at time $T=t_2$, node 24, which previously received the data from node 22 at time $T=t_1$, may determine that it is within range of node 12 and share the data with node 12 via a message 302.

Figure 3D:
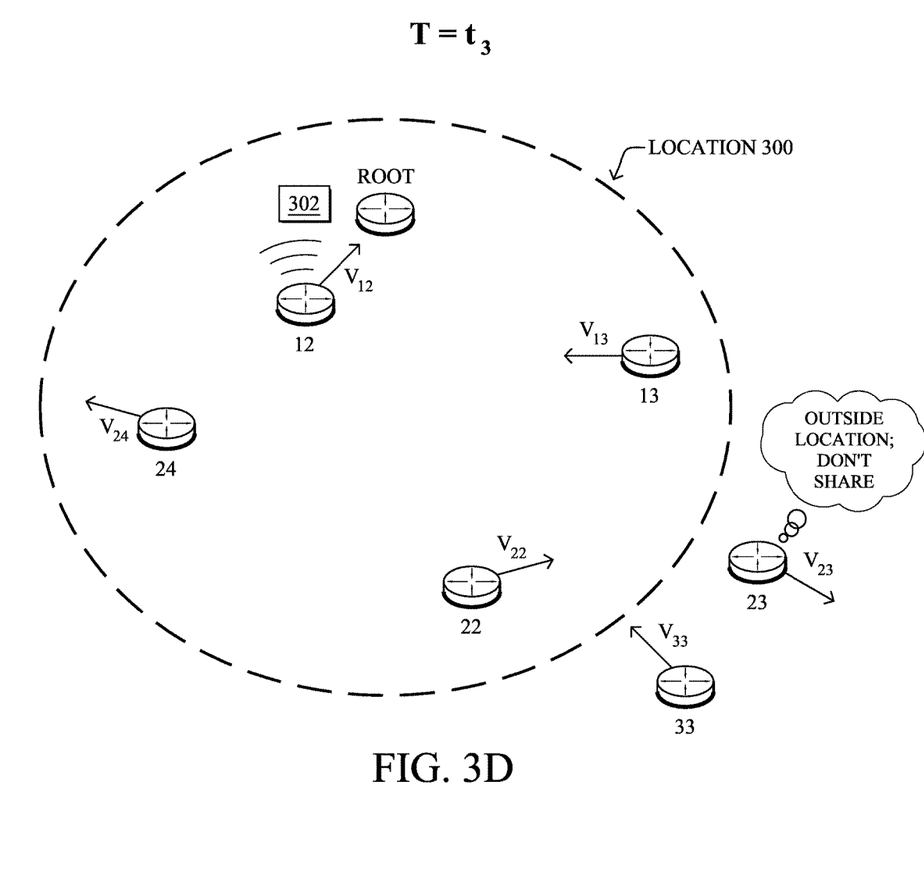

In FIG. 3D, at time $T=t_3$, node 12, which is now a carrier for the location-specific data may determine that it is within proximity of the Root node (e.g., an access point) and that both node 12 and the Root node are co-located at location 300. In turn, node 12 may share the location-specific data with the Root node via a wireless message 302.

Also as shown in FIG. 3D, however, assume that the originating node 23 has now left location 300 at time $T=t_3$. By definition, the location-specific data is tied to location 300. Thus, node 23 may determine that it is now outside of location 300 and prevent any sharing of the location-specific data, based on a comparison between the current location of node 23 and location 300 that is associated with the data. For example, even though node 23 is within close proximity of node 33, node 23 may not share the data with node 33, since node 23 is now outside of location 300. In some embodiments, node 23 may delete its local copy of the data upon leaving location 300. In other embodiments, node 23 may retain its local copy in case node 23 reenters location 300, and simply block transmission of the data while outside of location 300.

By way of non-limiting example, consider the case in which a vehicle is towed while the owner is inside a building. When the owner returns to location at which the vehicle was parked, the owner will not know whether the vehicle was towed or stolen. All that is known from the standpoint of the owner are the characteristics of the vehicle, such as the make, model, color, last known location, registration number, etc., and that the vehicle was taken away at some point.

Using the techniques herein, the tow truck driver that towed the vehicle could enter the information regarding the vehicle into his or her mobile device, before towing the vehicle. In turn, the phone can tag the vehicle data with the location and share the data with nearby devices, access points, and the like. By employing the above techniques, the data may continue to bounce from device to device within the area, as new passerbys enter the location. Similarly, devices that leave the area (e.g., cross a threshold distance from the GPS coordinate associated with the data) may delete the data, on crossing the threshold. In some cases, the stored location-specific data regarding the vehicle may not be directly accessible by the user of any hosting device. However, a user may still see that a message was relayed, in some cases. This When the owner of the vehicle returns to the location, he or she can then use the characteristics of the vehicle to query the devices in the location (e.g., the license plate number, etc.), using his or her own device. If a match is found, this allows the device of the owner of the vehicle to unlock the vehicle data originally left by that of the tow truck driver, thereby informing the owner that the vehicle was towed and any other information left by the tow truck driver (e.g., contact information for the towing company, business hours of the towing company, etc.).

Figure 4A:
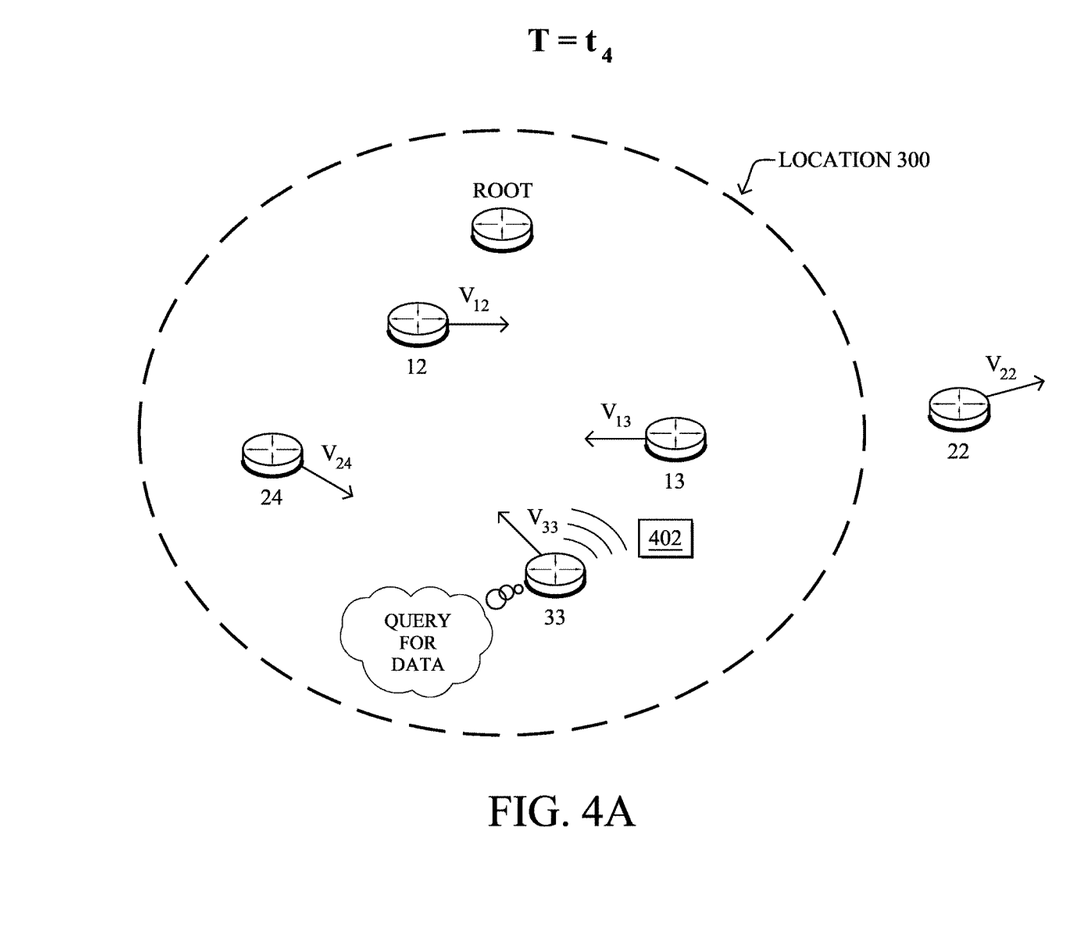
FIGS. 4A-4C illustrate the querying of data at a particular location.
Figure 4B:
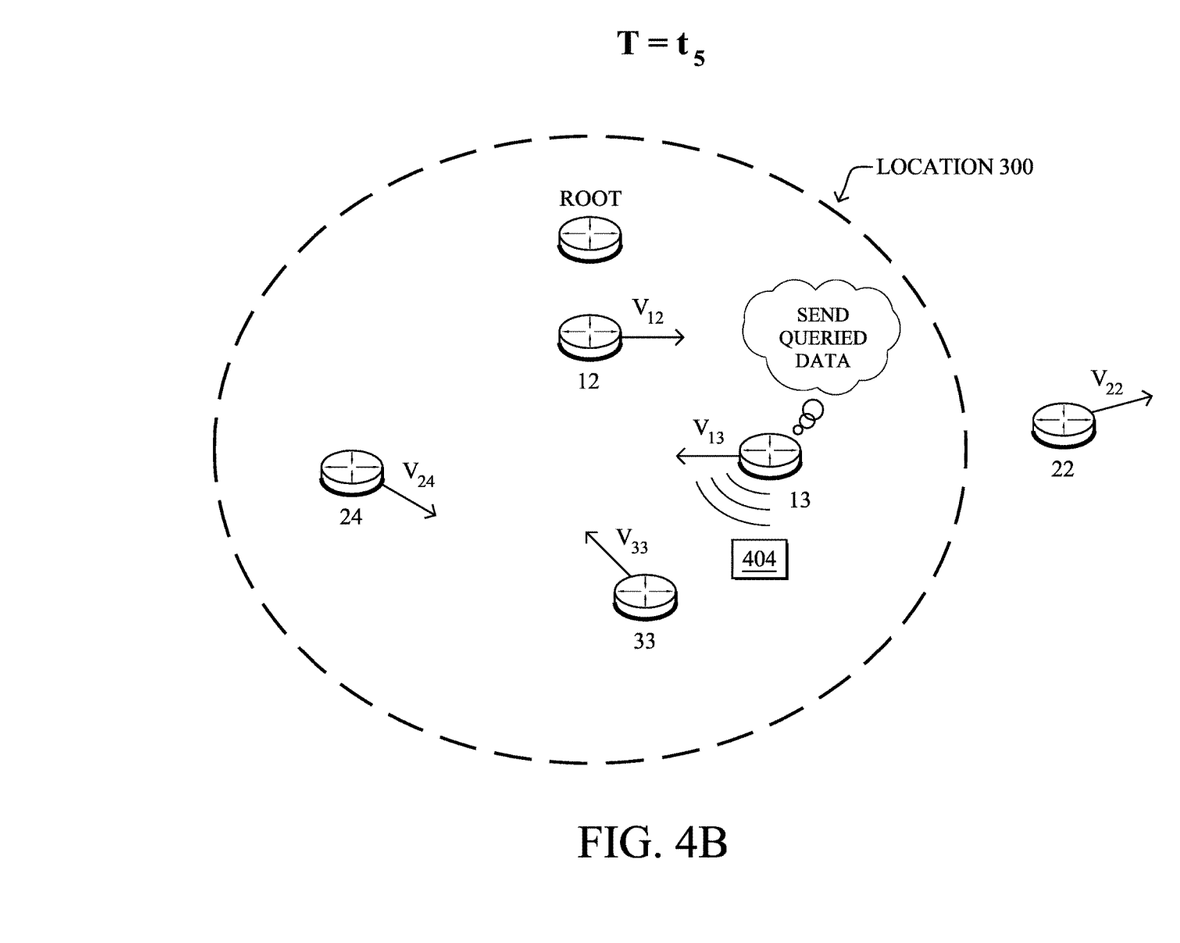
Figure 4C:
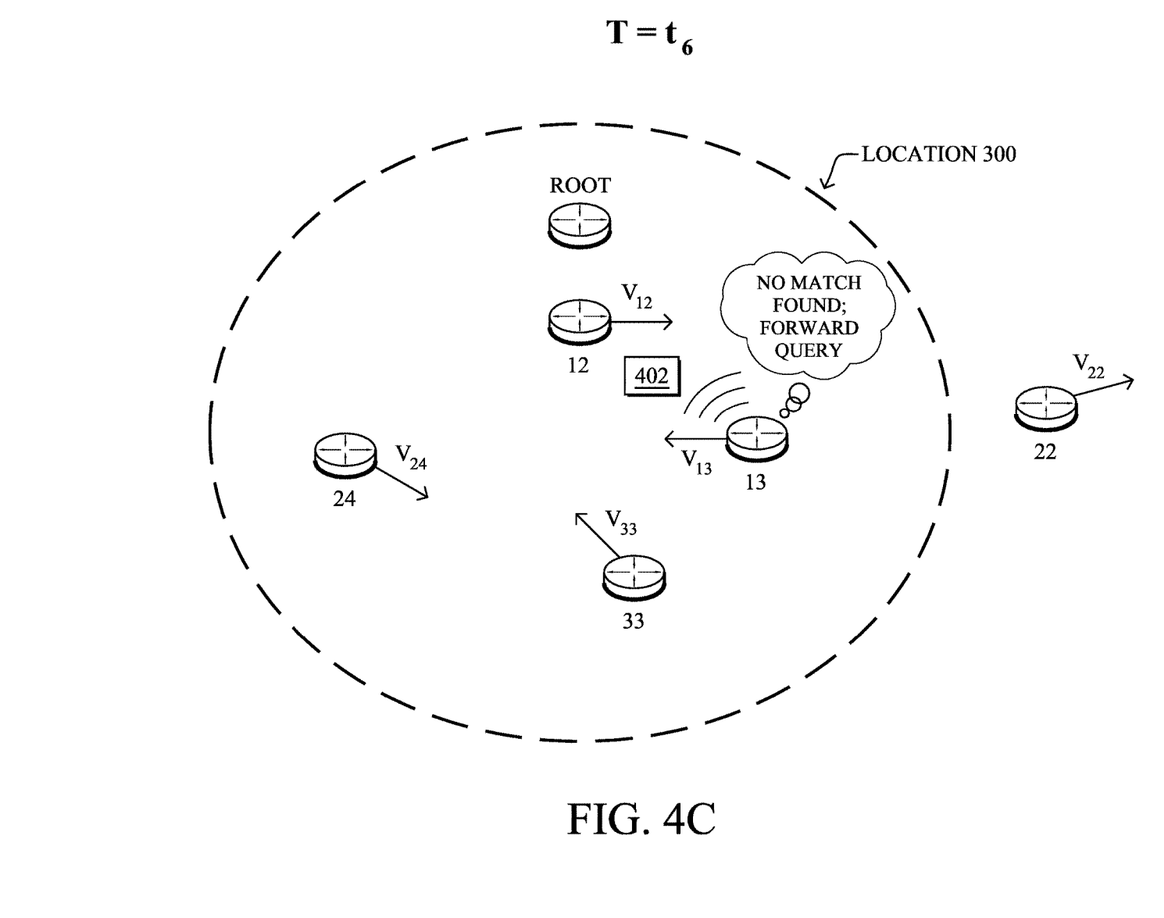

FIGS. 4A-4C illustrate the querying of data at a particular location using the techniques herein, according to various embodiments. Continuing the example of FIGS. 3A-3D, assume that node 33 enters location 300. In some embodiments, at time $T=t_4$, node 33 may pull the location-specific data left by node 23 at location 300 by issuing one or more queries 402 to any nearby devices co-located at location 300. For example, as shown in FIG. 4A, if node 33 and node 13 are both co-located at location 300, node 33 may send query 402 to node 13.

In various embodiments, query 402 may include any characteristics information that can be used by a receiving node/device to identify and retrieve the location-specific data (e.g., keywords, markers, etc.). For example, in the case of the location-specific data being data left by a tow truck driver, query 402 may include the license plate number of the towed vehicle, the make and model of the vehicle, the color of the vehicle, or any other information that can be used to match query 402 to the data left by the originating device.

For example, consider the case in which the user of node/device 33 lost a pink scarf in a shopping mall at location 300. At some point in time, the user of node/device 23 finds the scarf and leaves a location-specific message at location 300 that indicates that the scarf has been moved to the lost and found of the nearest store. In turn, this message will bounce from node to node within location 300 and will not be available or shared outside of location 300. In some cases, the users of the devices carrying the data may also be unable to read the message without sufficient knowledge of what the data includes (e.g., a user of node 13 may not know to query for a lost scarf and, thus, may not be able to read the message). When the owner of the scarf returns to location 300, he or she may operate device 33, to query nearby devices co-located at location 300 for the requisite keywords (e.g., 'scarf,' 'lost', 'pink,' etc.).

In further embodiments, query 402 may include image data that can be matched to the location-specific data. For example, assume that the user that found the scarf took a picture of the lost scarf using device 23. Thus, the location-specific data may also include image information that is tied to location 400. In turn, query 402 may include a picture of the scarf (e.g., taken earlier in the day), allowing the queried devices in location 300 to perform image recognition on the image included in query 402, to determine if a match exists with the message left by the user that found the scarf.

As shown in FIG. 4B, if a match is found between the location-specific data stored by node 13 and query 402 (e.g., using keyword matching, image recognition, etc.), node 13 may send the queried location-specific data to node 33 via response message 404.

However, if a match is not found, node 13 may continue to pass query 402 on to the local devices in location 300 until a match is found, as shown in FIG. 4C. A match may also be found in other data generated by other devices in location 300 (e.g., a security camera recorded the person that found the scarf walking towards the nearby store), which may be used to cumulatively update the location-specific message left by the user that found the scarf. In other cases, timestamp information can be used to retrace the path of the scarf and/or correlate query 402 with any information retained locally by any of the devices in location 300. Notably, by using a recursive query and answer mechanism, answers may give a sense of the movement of a queried person or object, as further queries are done to follow the movement.

Alternatively, rather than issuing queries to devices in location 300, node 33 may instead receive the location-specific data from one of the nearby devices (e.g., as part of the sharing process). In turn, in some embodiments, node 33 may issue local queries to the locally stored data, to unlock the queried information. In other words, rather than issue queries 402 to neighboring devices at location 300, node 33 may instead receive the location-specific data as part of the sharing process and then attempt to unlock the relevant data using the information in query 402 (e.g., by attempting to find a keyword or image match locally). If a match is found, node 33 may then present the original message to a user interface of node 33, such as a display, speaker, or the like.

Further embodiments also provide for the shared location-specific data to be an alert that does not require querying to unlock. For example, consider the case in which a suspicious bag is seen near a bench at location 300. The person finding it launches an alarm message (e.g., via node 23). This information then propagates from device to device in location 300, informing the device owners in location 300 as to the suspicious bag. At the same time, emergency services could be called (e.g., using the neighbor messaging or another method).

An alert may also trigger a local query at any receiving device in location 300. For example, the alert may include a picture of the bag, which can be used by the receiving devices to query local data regarding the bag and/or bag owner (e.g., security cameras, phones that were recording in location 300, etc.). If an image match is not found locally, the query can also be extended from device to device until a match is found. The match may further be found in historical data maintained by the devices, such as a security camera that record the owner of the bag walking down the street. Timestamp information can also be used to retrace the path of the bag owner, not only in the past (e.g., prior to reaching the bench), but also in the relative future (e.g., after dropping the bag). Potentially, an image of the owner with a timestamp close to the present may be found. In that case, the alarm message can be extended to the bag owner location, informing the general public to stay away from that location, as well, while the information is relayed to emergency services.

Figure 5:
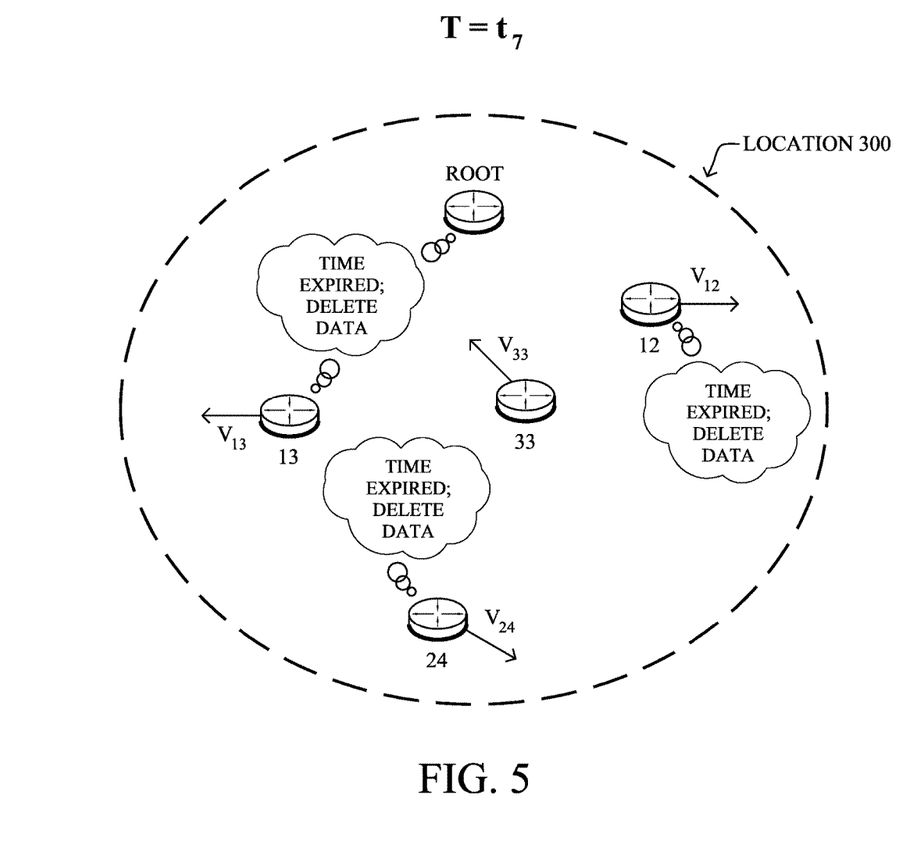
FIG. 5 illustrates deletion of location-specific data after a timeframe.

FIG. 5 illustrates deletion of location-specific data after a timeframe, according to various embodiments. As noted above, location-specific data may also be associated with a time period during which the data is to be retained at the location. Notably, the data may be associated with a timestamp by the originating node/device. Such a timestamp can then be used to define a retention timeframe, which can be explicitly set (e.g., by the user of the originating node) or may be predefined. On expiration of the time period, as shown, any node/device that is currently storing the location-specific data may delete the data from memory. In other embodiments, a storing node/device may delete the location-specific data on leaving location 300, crossing a threshold distance away from location 300, or upon successful query of the data by another node/device.

As would be appreciated, the techniques herein limit access to the location-specific data within specific locational and/or temporal boundaries, because it only exists at the location and potentially for a bounded time. This is in contrast to other approaches that may attempt to store the data in a centralized location, such as a remote server outside of the corresponding area. Further, as the data continues to exist locally in the area, the nodes/devices can enrich the data with any relevant data generated locally. For example, if the location-specific data is a message regarding a lost scarf, this data could be enriched with other information such as images taken of the scarf at certain points in time (e.g., the scarf was on a bench from 5:00 PM to 5:40 PM). The location-specific data can also expire if left unclaimed, such as deleting the message from the area after two days.

Figure 6:
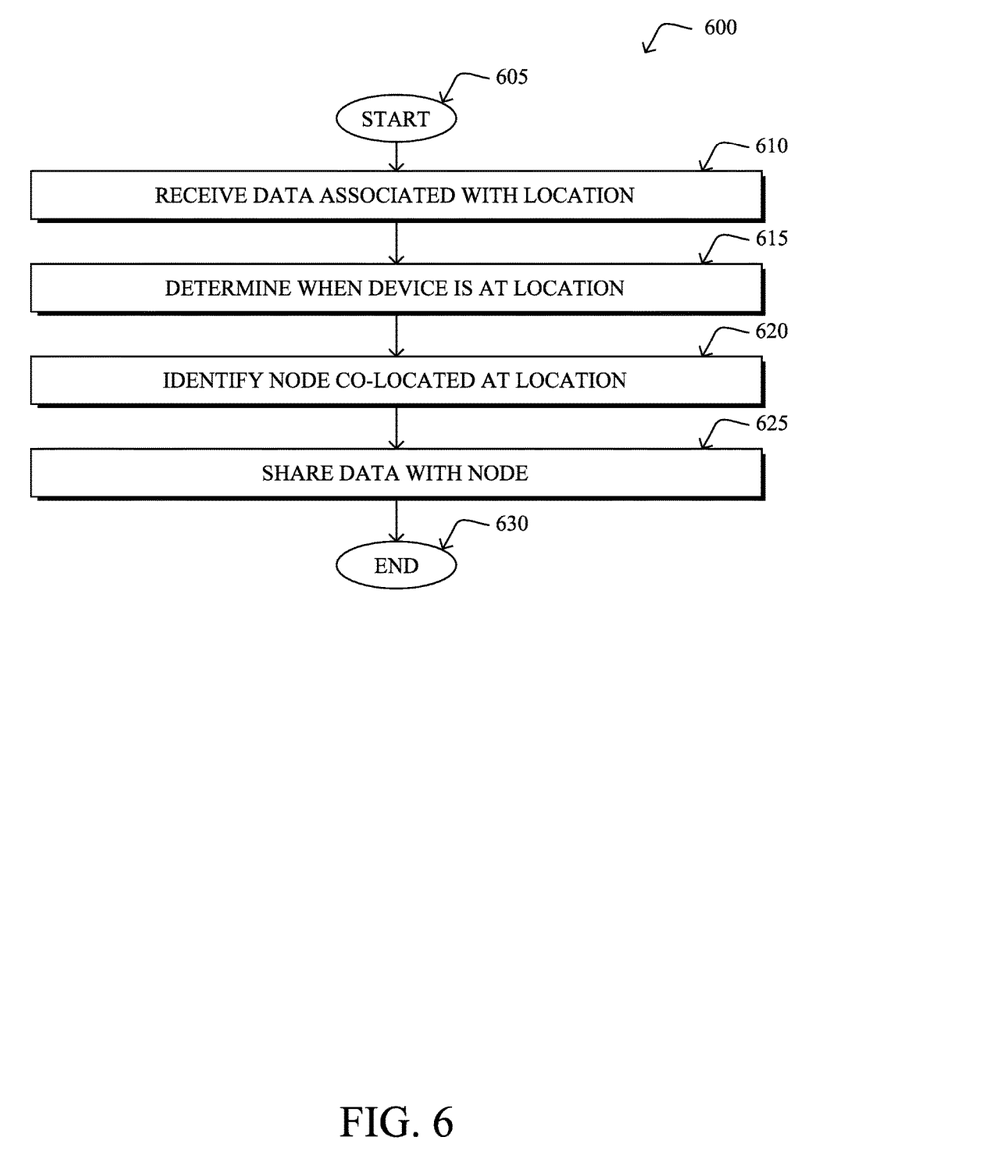
FIG. 6 illustrates an example simplified procedure for sharing location-specific data in a network.

FIG. 6 illustrates an example simplified procedure for sharing location-specific data in a network in accordance with one or more embodiments described herein. For example, a non-generic, specifically configured device (e.g., device 200) may perform procedure 400 by executing stored instructions (e.g., process 248). The procedure 600 may start at step 605, and continues to step 610, where, as described in greater detail above, the device may receive data associated with a particular location. In some embodiments, the location may be the location at which the data was first generated, i.e., the originating location of the data. For example, the data may be associated with a GPS coordinate or range of GPS coordinates, a street address, a building or other landmark, or the like.

At step 615, as detailed above, the device may determine when the device is at the particular location. For example, the device may monitor its local position (e.g., based on GPS receiver, cellular or WiFi location services, etc.) relative to the location associated with the data, to determine whether there is a match.

At step 620, the device may identify a node that is co-located with the device at the particular location, as described in greater detail above. For example, the device may use NAN messaging or another wireless messaging methodology, to identify a nearby node (e.g., a mobile device, an access point, an IoT node, etc.). Based on the determination in step 615, the device may further determine that both the device and the nearby node are co-located at the particular location associated with the data received in step 610.

At step 625, as detailed above, the device may share the data received in step 610 with the node, based on the device and node being co-located at the particular location. In some cases, the sharing may entail the node querying the device for the data (e.g., by including one or more characteristics of the data in the query). In further cases, the node may itself perform a local query of the data, after the device shares the location-specific data with the node. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow information to be made available locally without the originator having to be in contact with the receiver from a spatial and/or temporal standpoint. In some aspects, the relay nodes/devices cannot unlock and access the information. Also, this information allows a receiver to query for information that is location-relevant, without the receiver having to know about the location or identity of the originator, and without direct contact between the two in space or time.

While there have been shown and described illustrative embodiments that provide for location-specific data sharing, it is to be understood that various other adaptations and modifications may be made within the spirit and scope of the embodiments herein. For example, while certain embodiments are described herein with respect to using certain wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, data associated with a particular location;
   determining, by the device, a timeframe when the device is at the particular location by monitoring a local position of the device relative to the particular location;
   identifying, by the device, a node in the network as being co-located with the device at the particular location during the timeframe;
   receiving, at the device, a query from the node that indicates one or more characteristics of the data;
   matching, by the device, the indicated one or more characteristics of the data to the data; and
   in response to the indicated one or more characteristics matching and the node being co-located during the time frame, sharing, by the device, the data with the identified node, wherein the node performs a local query on the shared data, and wherein the shared data is configured to restrict access to the data unless the local query includes one or more characteristics of the shared data.

2. The method as in claim 1, wherein the one or more characteristics comprise an image.

3. The method as in claim 1, wherein the particular location corresponds to a location at which the data was first generated.

4. The method as in claim 1, further comprising:
   detecting, by the device, that the device is outside of the particular location; and preventing, by the device, all sharing of the data by the device when the device is outside of the particular location.

5. The method as in claim 1, wherein preventing all sharing of the data by the device comprises deleting the data in response to detecting that the device is outside of the particular location.

6. The method as in claim 1, wherein the method further comprises:
deleting, by the device, the data from the device on expiration of the timeframe.

7. An apparatus, comprising:
one or more network interfaces to communicate with a network;
a processor coupled to the one or more network interfaces and configured to execute one or more processes; and
a memory configured to store a process executable by the processor, the process when executed operable to:
receive data associated with a particular location;
determine a timeframe when the device is at the particular location by monitoring a local position of the device relative to the particular location;
identify a node in the network as being co-located with the device at the particular location during the timeframe;
receive a query from the node that indicates one or more characteristics of the data;
match the indicated one or more characteristics of the data to the data; and
in response to the indicated one or more characteristics matching and the node being co-located during the time frame, share the data with the identified node, wherein the node performs a local query on the shared data, and wherein the shared data is configured to restrict access to the data unless the local query includes one or more characteristics of the shared data.

8. The apparatus as in claim 7, wherein the one or more characteristics comprise an image.

9. The apparatus as in claim 7, wherein the particular location corresponds to a location at which the data was first generated.

10. The apparatus as in claim 7, wherein the process when executed is further operable to: detect that the device is outside of the particular location; and prevent all sharing of the data by the device when the device is outside of the particular location.

11. The apparatus as in claim 7 wherein preventing all sharing of the data by the device comprises the data in response to detecting that the device is outside of the particular location.

12. The apparatus as in claim 7, wherein the data is associated with a timeframe, and wherein the process when executed is further operable to delete the data from the device on expiration of the timeframe.

13. A tangible, non-transitory, computer-readable medium storing program instructions that cause a device in a network to execute a process comprising:
receiving, at the device, data associated with a particular location;
determining, by the device, a timeframe when the device is at the particular location by monitoring a local position of the device relative to the particular location;
identifying, by the device, a node in the network as being co-located with the device at the particular location during the timeframe;
receiving, by the device, a query from the node that indicates one or more characteristics of the data;
matching, by the device, the indicated one or more characteristics of the data to the data; and
in response to the indicated one or more characteristics matching and the node being co-located during the time frame, sharing, by the device, the data with the identified node based on the device and the node being co-located at the particular location during the timeframe.

14. The computer-readable medium as in claim 13, wherein the particular location corresponds to a location at which the data was first generated.

* * * * *